(12) United States Patent
Cantwell

(10) Patent No.: US 6,669,316 B2
(45) Date of Patent: Dec. 30, 2003

(54) DOCUMENT REPRODUCTION

(75) Inventor: Charles Eric Cantwell, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/118,827

(22) Filed: Apr. 9, 2002

(65) Prior Publication Data

US 2003/0189714 A1 Oct. 9, 2003

(51) Int. Cl.[7] .............................................. H04N 1/034
(52) U.S. Cl. ........................................................ 347/3
(58) Field of Search .............................. 347/3, 2, 1, 40, 347/225, 13, 234, 239, 248, 242, 257; 358/1.1–1.8; 399/88, 67, 223

(56) References Cited

U.S. PATENT DOCUMENTS 6,424,368 B1 * 7/2002 Vodopivec et al. ......... 347/234

OTHER PUBLICATIONS

TechsoftUSA, http://www.techsoft–usa.com/Vecorizing.htm, copyright 2001.*
Parallax69, http://www.parallax69software.com/vectorize.htm, copyright 2003.*

* cited by examiner

Primary Examiner—Raquel Yvette Gordon

(57) ABSTRACT

A document is reproduced by capturing an image of the document, generating a set of vector commands, and creating a duplicate document from the vector commands. The image is captured by scanning or other suitable means. The set of vector commands is generated by identifying vectors within the raster image and for each vector identified within the raster image, generating at least one vector command for replicating the identified vector. The duplicate document is created by executing the set of vector commands on an output device. The set of vector is either delivered directly to the output device or stored to a file and the file delivered to the output device.

12 Claims, 2 Drawing Sheets

DOCUMENT REPRODUCTION

FIELD OF THE INVENTION

This invention relates in general to reproducing a document and, more particularly, to reproducing a document from a set of vector commands generated from a captured image of the document.

BACKGROUND OF THE INVENTION

Document reproduction is commonplace. In one conventional document reproduction system, a document is scanned to generate a raster image of the document. The raster image is sent to an output system to generate a hardcopy duplicate of the document. Some document reproduction systems additionally allow the document to be saved in raster format for later viewing, printing, or manipulation.

Generating a hardcopy document from a raster image of the document is resource intensive and time consuming. Additionally, saving raster images requires relatively large amounts of storage space.

SUMMARY OF THE INVENTION

According to principles of the present invention, a document is reproduced by capturing an image of the document, generating a set of vector commands, and creating a duplicate document from the vector commands. The image is captured by scanning or other suitable means. The set of vector commands is generated by identifying vectors within the raster image and for each vector identified within the raster image, generating at least one vector command for replicating the identified vector. The duplicate document is created by executing the set of vector commands on an output device.

According to further principles of the present invention, the set of vector commands is stored to a file. The file is delivered to an output device.

DETAILED DESCRIPTION OF THE INVENTION

Figure 1:
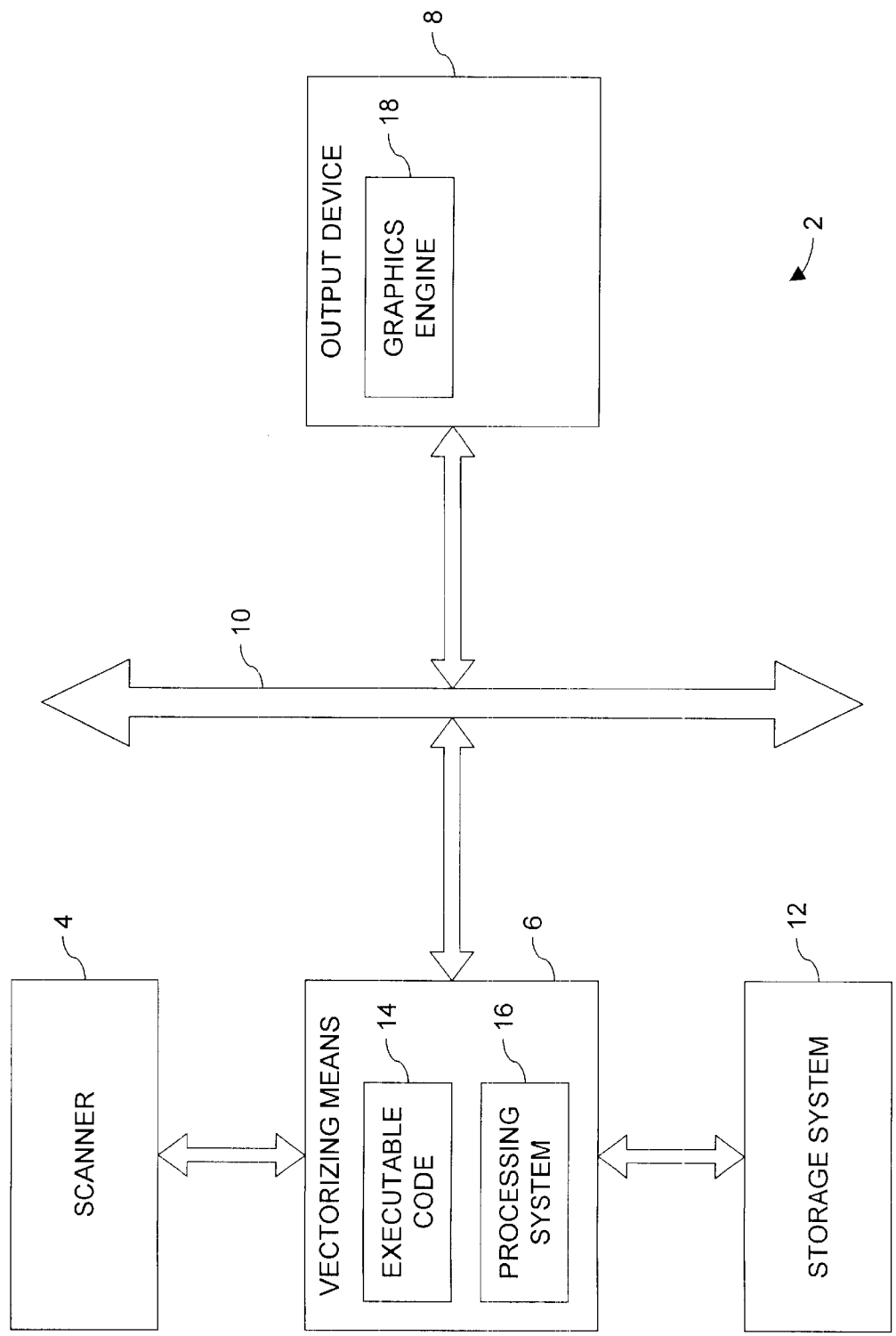
FIG. 1 is a block diagram of one embodiment of a document reproduction system of the present invention.

Illustrated in FIG. 1 is one embodiment of a document reproduction system 2 of the present invention. Document reproduction system 2 includes scanner 4, vectorizing means 6, output device 8, communication means 10, and optionally storage system 12.

Scanner 4 is any device or system configured to capture a raster image of a document. Examples of scanner 4 include a fixed charge couple device (CCD) and a sweeping CCD.

Vectorizing means 6 is any device or system configured to generate a set of vector commands from a raster image. Vector commands are commands useable by an output device to output vectors in hardcopy form. In one embodiment, vectorizing means 6 includes means for identifying vectors within the raster image and means for generating at least one vector command for replicating each vector identified within the raster image. Furthermore, in one embodiment, vectorizing means 6 includes executable code 14 and processing system 16.

Executable code 14 is any code capable of being executed by processing system 16 for generating a set of vector commands from a raster image. Examples of executable code include firmware and software code.

Processing system 16 is any device or system configured to process executable code 14.

Output device 8 is any device or system generating a reproduction hardcopy output from a set of vector commands. Examples of output device 8 include a printer, a plotter, facsimile machine, a copier, and a multifunction device. In one embodiment, output device 8 includes a graphics engine 18 configured to execute a set of vector commands to generate a reproduction of the document on the output device.

Communication means 10 is any device, system, or combination of hardware and executable code for communicating a set of vector commands from vectorizing means 6 to graphics engine 18. In one embodiment, communication means 10 is a system bus. In an alternative embodiment, communication means 10 includes a local communication system. In a further embodiment, communication means 10 includes a network, such as a local network, a wide area network, or the Internet.

Storage system 12 is any device or system configured to store data, vector commands as a file or executable code 14. Storage system 12 may also be a program storage system tangibly embodying a program, applet, or instructions executable by processing system 16 for performing the method steps of the present invention executable by processing system 16. Storage system 12 may be any type of storage media such as magnetic, optical, or electronic storage media. Storage system 12 is illustrated in FIG. 1 as a single device. Alternatively, storage system 12 may include a plurality of devices. Furthermore, each device of storage system 12 may be embodied in a different media type. For example, one device of storage system 12 may be a magnetic storage media while another device of storage system 12 is an electronic storage media.

Figure 2:
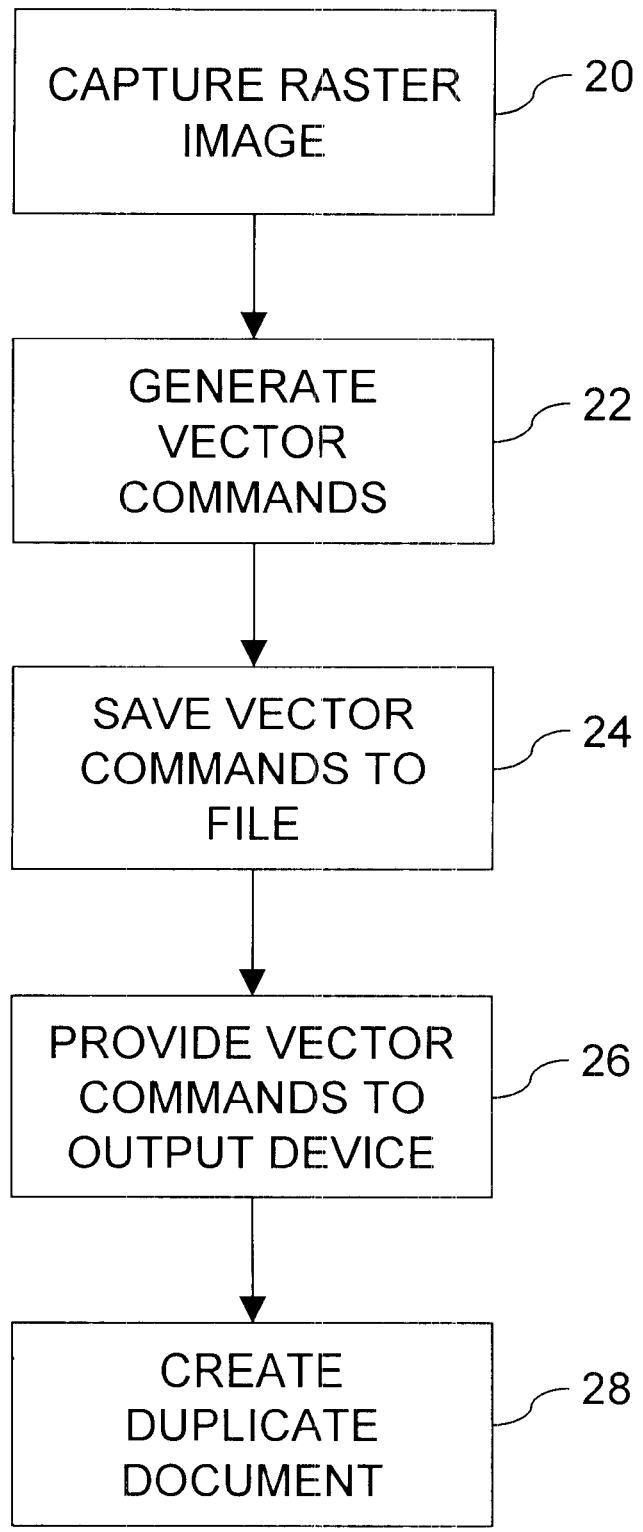
FIG. 2 is a flow chart illustrating one embodiment of the present invention method for reproducing a document.

FIG. 2 is a flow chart representing steps of one embodiment of the present invention. Although the steps represented in FIG. 2 are presented in a specific order, the present invention encompasses variations in the order of steps. Furthermore, additional steps may be executed between the steps illustrated in FIG. 2 without departing from the scope of the present invention.

A raster image of the document is captured 20. In one embodiment, capturing 20 the raster image of the document includes scanning the document.

A set of vector commands is generated 22 from the raster image In one embodiment, generating 22 the set of vector commands includes: identifying vectors within the raster image and for each vector identified within the raster image, generating at least one vector command for replicating the identified vector.

Optionally, the set of vector commands is saved 24 to a file on storage system 12. The file is delivered 26 to an output device 8. A duplicate document is created 28 from the set of vector commands. In one embodiment, the duplicate document is created 28 by executing the set of vector commands on output device 8.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for reproducing a document, the method comprising:

(a) capturing a raster image of the document;

(b) generating a set of vector commands from the raster image;

(c) communicating the set of vector commands over a system bus from a vectorizing means to a graphic engine; and, (d) executing the communicated set of vector commands on the graphics engine to generate a reproduction of the document.

2. The method of claim 1 wherein capturing the raster image of the document includes scanning the document.

3. The method of claim 1 wherein generating the set of vector commands includes:

(a) identifying vectors within the raster image;

(b) for each vector identified within the raster image, generating at least one vector command for replicating the identified vector.

4. The method of claim 1 further including saving the set of vector commands to a file on storage system.

5. A system for reproducing a document, the system comprising:

(a) a scanner configured to capture a raster image of the document;

(b) vectorizing means for generating a set of vector commands from the raster image;

(c) a graphics engine configured to execute the set of vector commands, generated by the vectorizing means, to generate a reproduction of the document; and, (d) a system bus for communicating the set of vector commands from the vectorizing means to the output device.

6. The system of claim 5 wherein the vectorizing means includes:

(a) a processing system; and, (b) executable code for instructing the processing system to generate the set of vector commands from the raster image.

7. The system of claim 5 wherein the vectorizing means includes:

(a) means for identifying vectors within the raster image; and, (b) means for generating at least one vector command for replicating each vector identified within the raster image.

8. The system of claim 5 further including a storage system configured to store the set of vector commands as a file.

9. A program storage system readable by a computer, tangibly embodying a program, applet, or instructions executable by the computer to perform method steps for reproducing a document, the method steps comprising:

(a) capturing a raster image of the document;

(b) generating a set of vector commands from the raster image;

(c) communicating the set of vector commands over a system bus from a vectorizing means to a graphic engine; and, (d) executing the set of vector commands on the graphics engine to generate a reproduction of the document.

10. The program storage system of claim 9 wherein the method step of capturing the raster image of the document includes scanning the document.

11. The program storage system of claim 9 wherein the method step of generating the set of vector commands includes:

(a) identifying vectors within the raster image;

(b) for each vector identified within the raster image, generating at least one vector command for replicating the identified vector.

12. The program storage system of claim 9 wherein the method steps further include saving the set of vector commands to a file on storage system.

* * * * *